(12) United States Patent
Ishiwata

(10) Patent No.: US 10,884,230 B2
(45) Date of Patent: Jan. 5, 2021

(54) PHASE OBJECT VISUALIZATION APPARATUS AND PHASE OBJECT VISUALIZATION METHOD

(71) Applicant: OLYMPUS CORPORATION, Hachioji (JP)

(72) Inventor: Hiroshi Ishiwata, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 185 days.

(21) Appl. No.: 15/607,223

(22) Filed: May 26, 2017

(65) Prior Publication Data

US 2017/0351083 A1 Dec. 7, 2017

(30) Foreign Application Priority Data

Jun. 1, 2016 (JP) ................................. 2016-110169

(51) Int. Cl.
*H04N 7/18* (2006.01)
*G02B 21/36* (2006.01)
(Continued)

(52) U.S. Cl.
CPC ....... *G02B 21/367* (2013.01); *G02B 21/0088* (2013.01); *G02B 21/14* (2013.01);
(Continued)

(58) Field of Classification Search
CPC .. G02B 21/367; G02B 21/0088; G02B 21/14; G02B 21/361; G02B 27/50; G02B 27/52
(Continued)

(56) References Cited

U.S. PATENT DOCUMENTS

| 5,751,475 A | 5/1998 | Ishiwata et al. |
| 5,969,853 A * | 10/1999 | Takaoka ................. G02B 21/14 |
| | | 359/370 |

(Continued)

FOREIGN PATENT DOCUMENTS

| JP | 07225341 A | 8/1995 |
| JP | 08122648 A | 5/1996 |

(Continued)

OTHER PUBLICATIONS

Lei Tian, et al., "Quantitative differential phase contrast imaging in an LED array microscope," Optics Express, 11394, vol. 23, No. 9, May 4 2015, 10 Pages.

(Continued)

*Primary Examiner* — Jayanti K Patel
*Assistant Examiner* — Richard B Carter
(74) *Attorney, Agent, or Firm* — Holtz, Holtz & Volek PC

(57) ABSTRACT

A phase object visualization apparatus includes: an illumination optical system 11 that illuminates a phase object; an image formation optical system 12 that forms an image from light from sample S that corresponds to the phase object; and light blocking unit 10 for blocking light, the light blocking unit 10 being disposed between the sample S and an image plane formed by the image formation optical system 12, and including an aperture at a position decentered from the optical axis of the image formation optical system 12. The position of the aperture is such that an area occupied on the aperture by 0-order diffraction light from the sample S illuminated by the illumination optical system 11 becomes smaller than the total area of the aperture.

7 Claims, 12 Drawing Sheets

(51) Int. Cl.
*G02B 27/52* (2006.01)
*G02B 21/14* (2006.01)
*G02B 21/00* (2006.01)
*G02B 27/50* (2006.01)

(52) U.S. Cl.
CPC ........... *G02B 21/361* (2013.01); *G02B 27/50* (2013.01); *G02B 27/52* (2013.01)

(58) Field of Classification Search
USPC ............ 348/78, 79; 356/123, 451, 502, 620; 369/112.08; 359/32, 370, 383; 1/1
See application file for complete search history.

(56) References Cited

U.S. PATENT DOCUMENTS

| | | | |
|---|---|---|---|
| 7,564,622 B2 | 7/2009 | Ishiwata | |
| 2003/0021215 A1* | 1/2003 | Yoo | G02B 5/1876 369/112.08 |
| 2005/0083535 A1* | 4/2005 | Kamshilin | G01H 9/00 356/502 |
| 2006/0033972 A1* | 2/2006 | Takemori | G03H 1/08 359/32 |
| 2006/0238711 A1 | 10/2006 | Kitajima | |
| 2008/0225278 A1* | 9/2008 | Namba | G01N 21/6458 356/123 |
| 2008/0259345 A1 | 10/2008 | Fukutake | |
| 2009/0032732 A1 | 2/2009 | Konishi et al. | |
| 2009/0086314 A1* | 4/2009 | Namba | G02B 21/34 359/383 |
| 2010/0245848 A1* | 9/2010 | Sakamoto | G03B 27/32 356/620 |
| 2011/0235045 A1* | 9/2011 | Koerner | G02B 21/0056 356/451 |
| 2012/0057013 A1* | 3/2012 | Ishiwata | G02B 21/367 348/78 |
| 2012/0086795 A1 | 4/2012 | Weiss et al. | |
| 2013/0258090 A1 | 10/2013 | Steinmeyer et al. | |
| 2017/0289452 A1* | 10/2017 | Noda | G03B 7/0807 |
| 2018/0039058 A1 | 2/2018 | Steinmeyer et al. | |

FOREIGN PATENT DOCUMENTS

| | | |
|---|---|---|
| JP | 09197289 A | 7/1997 |
| JP | 2003131139 A | 5/2003 |
| JP | 2004354650 A | 12/2004 |
| JP | 2005173288 A | 6/2005 |
| JP | 2012073591 A | 4/2012 |
| JP | 2012083755 A | 4/2012 |
| JP | 2013167746 A | 8/2013 |

OTHER PUBLICATIONS

Japanese Office Action (and English language translation thereof) dated Jan. 27, 2015, issued in counterpart Japanese Application No. 2011-170502.

Japanese Office Action (and English language translation thereof) dated Jan. 9, 2015, issued in counterpart Japanese Application No. 2011-170502.

Notice of Allowance dated Jan. 30, 2015 issued in U.S. Appl. No. 13/221,581.

Office Action (non-final) dated Aug. 25, 2014 issued in U.S. Appl. No. 13/221,581.

Related U.S. Appl. No. 13/221,581; First Named Inventor: Hiroshi Ishiwata; Title: "Method and Apparatus for Visualizing Phase Object"; filed: Aug. 30, 2011.

Kawakami, "Industrial Applications of Stacked Photonic Crystal", 2008.

Sheppard, et al., "Fourier Imaging of Phase Information in Scanning and Conventional Optical Microscopes", pp. 513-536.

Japanese Office Action (and English language translation thereof) dated Sep. 1, 2015, issued in counterpart Japanese Application No. 2011-170502.

Japanese Office Action (and English language translation thereof) dated Jan. 28, 2020 issued in Japanese Application No. 2016-110169.

* cited by examiner

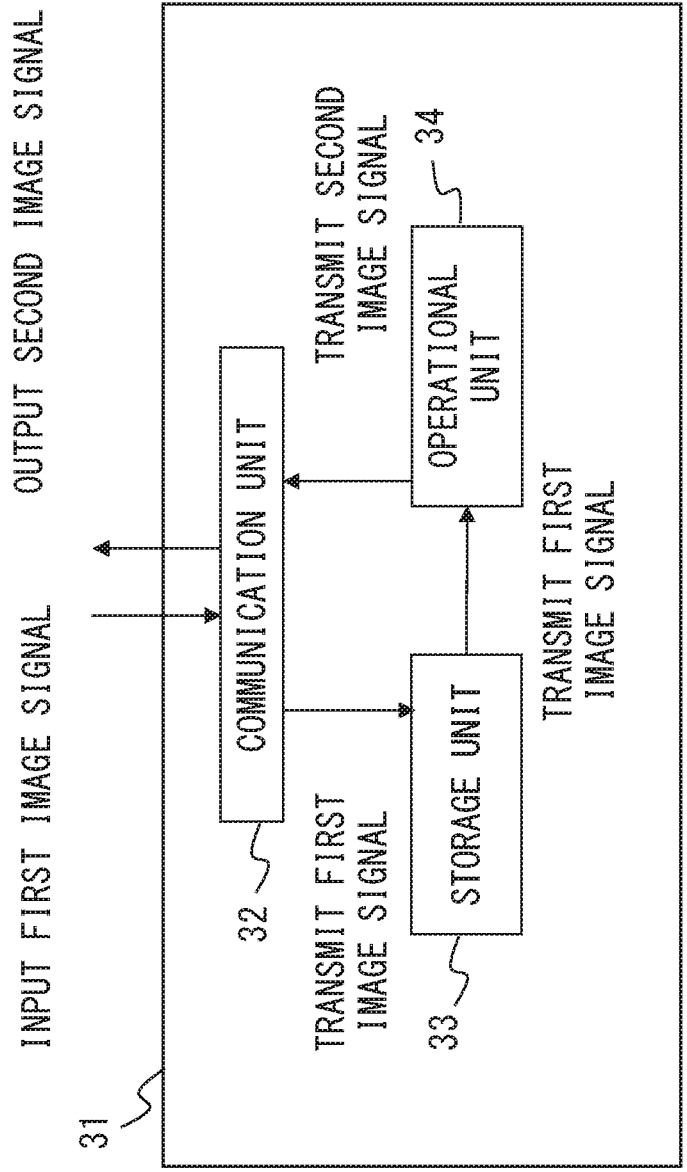
F I G. 7

PHASE OBJECT VISUALIZATION APPARATUS AND PHASE OBJECT VISUALIZATION METHOD

CROSS-REFERENCE TO RELATED APPLICATION

This application is based upon and claims the benefit of priority from prior Japanese Patent Application No. 2016-110169, filed Jun. 1, 2016, the entire contents of which are incorporated herein by this reference.

BACKGROUND OF THE INVENTION

Field of the Invention

The present invention relates to a phase object visualization apparatus and a phase object visualization method for visualizing and observing a phase object.

Description of the Related Art

Conventionally, techniques have been known for visualizing a phase object using oblipue illumination. Phase objects provide a phase difference in light due to a refractive index difference from a surrounding medium or due to the shape thereof, and include, for example, cultured cells and metals having microfabricated surfaces.

Techniques for visualizing a phase object using oblique illumination are described in, for example, Japanese Laid-open Patent Publication Nos. 2012-73591 and 2012-83755.

In the technique described in Japanese Laid-open Patent Publication No. 2012-73591, two contrast-reversed images obtained by applying oblique illumination to a sample from two directions symmetric with respect to an optical axis are calculated to obtain an image with a higher contrast.

A technique has also been disclosed in which a movable aperture is provided in an illumination optical system so as to change or adjust an incidence angle in performing oblique illumination, as in the technique described in Japanese Laid-open Patent Publication No. 2012-83755.

SUMMARY OF THE INVENTION

A phase object visualization apparatus in accordance with one aspect of the invention includes: an illumination optical system that illuminates a phase object; an image formation optical system that forms an image from light from the phase object; and light blocking unit for blocking light, the light blocking unit being disposed between the phase object and an image plane formed by the image formation optical system, and including an aperture at a position decentered from an optical axis of the image formation optical system, wherein the position of the aperture is such that an area occupied on the aperture by 0-order diffraction light from the phase object illuminated by the illumination optical system becomes smaller than the total area of the aperture.

A phase object visualization method for visualizing a phase object in accordance with one aspect of the invention includes: illuminating, by an illumination optical system, the phase object; and forming, by an image formation optical system and on an image plane, an image from light from the phase object, wherein light is blocked between the phase object and the image plane, and an aperture provided at a position decentered from an optical axis of the image formation optical system is positioned such that an area occupied on the aperture by 0-order diffraction light from the phase object illuminated by the illumination optical system becomes smaller than the total area of the aperture.

BRIEF DESCRIPTION OF THE DRAWINGS

The present invention will be more apparent from the following detailed description when the accompanying drawings are referenced.

FIG. 7 illustrates functional components of an operational apparatus;

DESCRIPTION OF THE EMBODIMENTS

Conventionally, a method of visualizing a phase object using oblique illumination could possibly cause the following problem.

Biological samples such as cultured cells are often cultured using a culture container such as a well plate that has a plurality of wells (culture regions) in which the biological samples are put. In visualizing biological samples put in such a culture container, the biological sample in each well is subject to oblique illumination. In this case, depending on the angle of illumination light, the illumination light could possibly be blocked by an end portion of the well and thus fail to reach some regions on the biological sample within the well. In such a situation, to sufficiently illuminate the biological sample, the angle of the oblique illumination needs to be essentially 0° (an angle such that the oblique illumination becomes essentially perpendicular to the sample); this makes it difficult to detect diffracted light that enhances a contrast in a particular direction in oblique illumination. That is, the phase object cannot be clearly visualized. The method for visualization based on oblique illumination could cause a problem of only a narrow area on a biological sample being visualized.

In view of the actual situation described above, an object of the present invention is to provide a technique for clearly visualizing a phase object without relying on oblique illumination.

Figure 1:
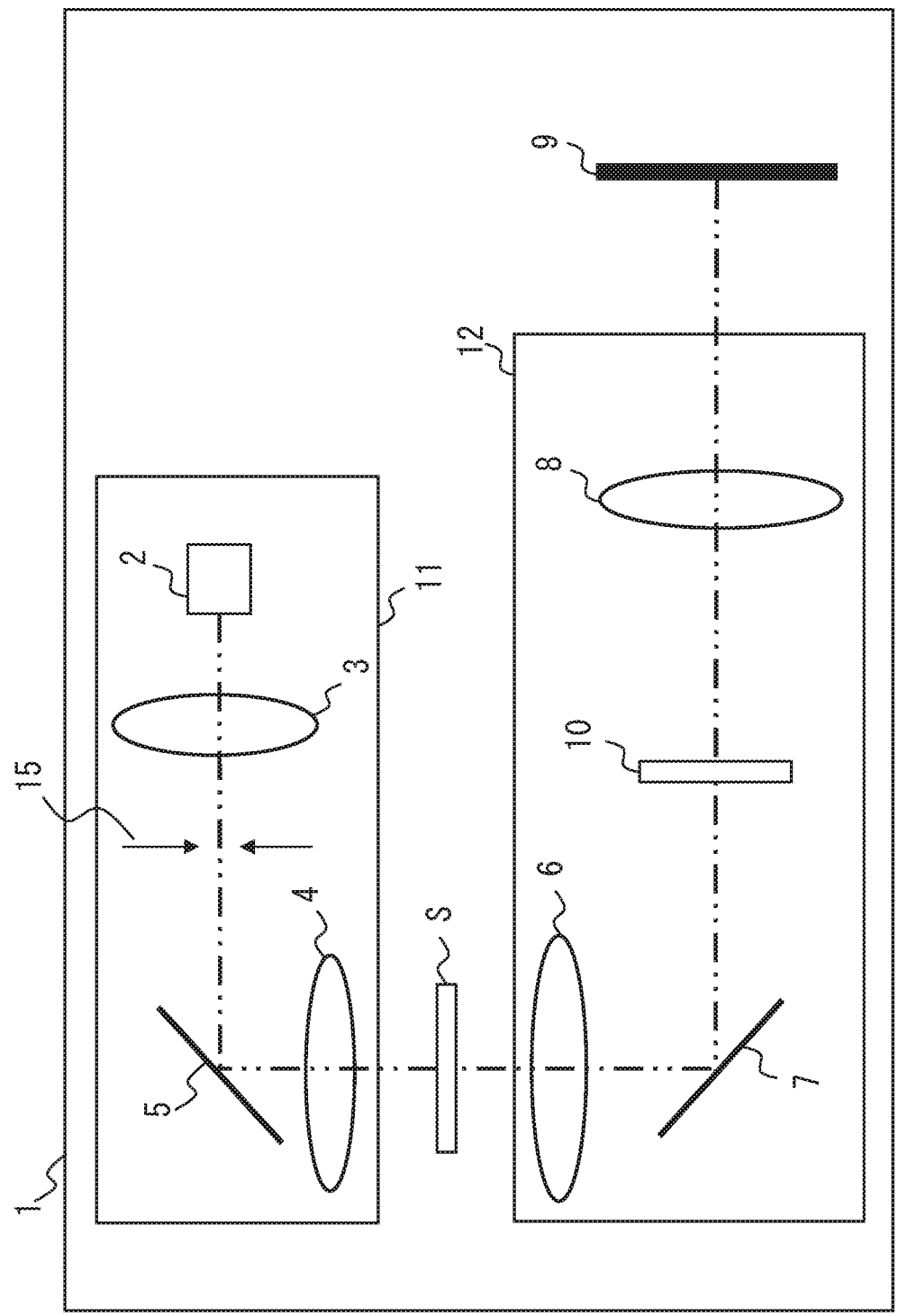
FIG. 1 illustrates a phase object visualization apparatus in accordance with a first embodiment.

The following describes a phase object visualization apparatus in accordance with a first embodiment of the invention by referring to the drawings. FIG. 1 illustrates a phase object visualization apparatus 1 in accordance with the first embodiment. The phase object visualization apparatus 1 is an inverted microscope for observing a sample S, which is a phase object, using transmitted illumination. The phase object visualization apparatus 1 includes: a light source 2, lenses 3 and 4, and a mirror 5 that together serve as an illumination optical system 11 that illuminates the sample S; and an objective 6, a mirror 7, and an image formation lens 8 that together serve as an image formation optical system 12 for forming an image from light from the sample S. The phase object visualization apparatus 1 includes, at the position of a focal plane formed by the image formation optical system 12, an image pickup element 9 that converts an image of the sample S into an image signal. The phase object visualization apparatus 1 also includes an aperture stop 15 within the illumination optical system 11. The phase object visualization apparatus 1 also includes light blocking unit 10 between the sample S and the image pickup element 9.

The light blocking unit 10 blocks light from the sample S. The light blocking unit 10 includes an aperture 10a at a position decentered from the optical axis of the image formation optical system 12.

The aperture 10a is, for example, a physical aperture provided at the light blocking unit 10. The aperture 10a is located at a position such that light from the sample S illuminated by the illumination optical system 11 passes through a portion of the aperture 10a. Specifically, the light from the sample S refers to light that is not diffracted by the sample S, i.e., light that would form a region 13 at a pupil position of the objective 6 (this will be described hereinafter) on the assumption that the sample S, or a phase object, is not present or that the phase of the sample S is uniform. The light may hereinafter be referred to as 0-order diffraction light. In other words, the aperture 10a is located at a position such that the area of 0-order diffraction light passing through the aperture 10a is smaller than that of the aperture 10a.

In the embodiment, the light blocking unit 10 is provided at, for example, a pupil position of the objective 6. The aperture 10a is movable on a plane that is perpendicular to the optical axis of the image formation optical system 12. For example, the aperture 10a may be rotatable on the optical axis.

A monochromatic LED is used for the light source 2. In addition, a mercury lamp or a xenon lamp may be used.

The image pickup element 9 is, for example, a CCD or a CMOS. The image pickup element 9 is connected to a display medium such as a monitor (not illustrated) and outputs an obtained image signal to the display medium so that a user can visually check the image. The image pickup element 9 may be connected to a control apparatus provided with a storage apparatus that stores image signals.

The sample S is a biological sample such as cultured cells that allows passage of light and that makes a phase difference in the light that has passed therethrough. For example, the sample S may be put in any of the wells of a well plate.

In the phase object visualization apparatus 1 that has the configuration described above, light sent to the sample S by the illumination optical system 11 is divided into 0-order diffraction light and diffracted light that has been diffracted by the sample S and that has a difference in phase from illumination light; the 0-order diffraction light and the diffracted light are incident on the image formation optical system 12 and formed into an image on the image pickup element 9. In particular, in the phase object visualization apparatus 1 of the invention, diffracted light that has been diffracted by an end (edge) of the sample S passes through the aperture 10a of the light blocking unit 10. Hence, even when the illumination optical system 11 illuminates the sample S with light perpendicular to the sample S, an image can be formed on the image pickup element 9 such that a contrast is enhanced in a particular direction of the sample S. That is, as in the case of oblique illumination, the sample S, a phase object, can be visualized clearly for observation. The following describes functions of the aperture 10a in detail on the basis of an example of light that passes through the aperture 10a.

Figure 2:
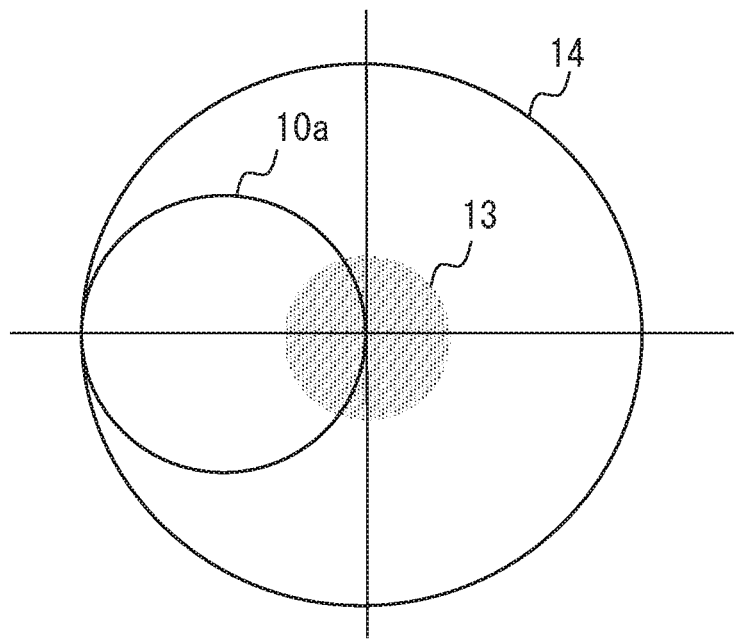
FIG. 2 illustrates an example of the positioning of an aperture in accordance with a first embodiment.

FIG. 2 illustrates an example of the positioning of the aperture 10a as seen from an optical axis direction. FIG. 2 depicts a positional relationship between the aperture 10a, a region 13 formed by 0-order diffraction light that is sent from the sample S and incident on the light blocking unit 10 provided with the aperture 10a, and a pupil 14 of the objective 6. Although not illustrated, the light blocking unit 10 is larger than the pupil 14. The located area of the light blocking unit 10 spreads across a wider area than the located area of the pupil 14.

The region 13 represented as a hatch pattern indicates a projection image of the aperture stop 15 of the illumination optical system 11. In this example, the aperture stop 15 and the exit pupil position of the objective 6 are located at positions that are essentially optically conjugate to each other. The aperture stop 15 has a predetermined aperture diameter such that a light flux at the exit pupil position of the objective does not occupy the entirety of the pupil.

In a case where the light source of the illumination optical system and a collector lens are designed to achieve a predetermined diameter such that the light flux at the exit pupil position of the objective does not occupy the entirety of the pupil of the objective, the aperture stop 15 can be omitted.

In this case, the sample S is illuminated with illumination light that is essentially perpendicular to the sample S, and hence 0-order diffraction light passes through the region 13, which includes the center of the pupil 14 of the objective 6. The diameter of 0-order diffraction light at the pupil 14, i.e., the diameter of the region 13, is shorter than the diameter of the pupil 14. In the embodiment, the phase object visualization apparatus 1 is configured in a manner such that an image resulting from the light source 2 is formed in a light flux portion of the 0-order diffraction light at the pupil 14.

The aperture 10a is located at a position decentered from the optical axis of the image formation optical system 12, and the light blocking unit 10 shades regions surrounding the aperture 10a, including the pupil 14. That is, the aperture 10a is located at a position such that 0-order diffraction light passes through a portion of the aperture 10a. Accordingly, 1-order diffraction light moving in a particular direction that has been diffracted by an edge of the sample S passes through the aperture 10a.

Figure 3:
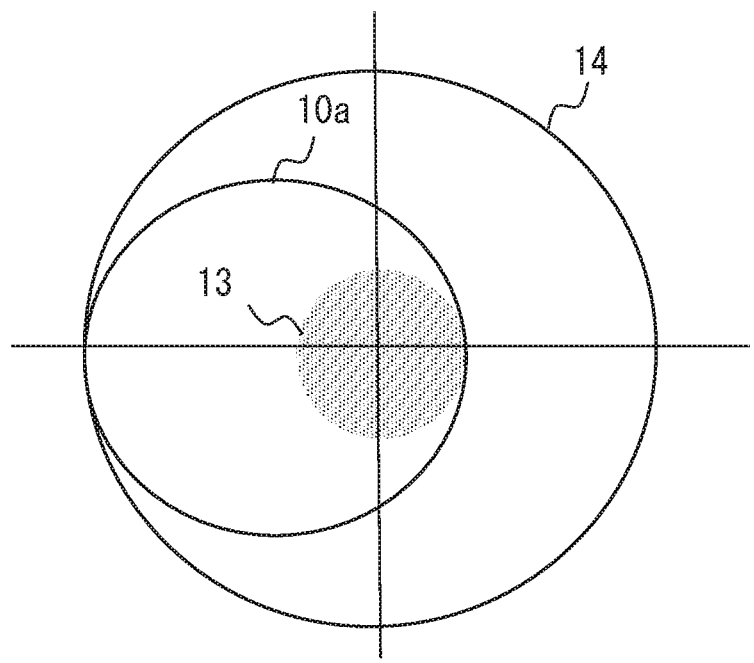
FIG. 3 illustrates another example of the positioning of an aperture in accordance with a first embodiment.

The aperture 10a only needs to be located at a position decentered from the optical axis of the image formation optical system 12 in a manner such that 0-order diffraction light passes through a portion of the aperture 10a, and the positioning is not limited to the one depicted in FIG. 2. For example, the aperture 10a may have the positional relationship depicted in FIG. 3. FIG. 3 illustrates an example of the positioning of the aperture 10a that is different from the example depicted in FIG. 2. In the example depicted in FIG. 2, a portion of 0-order diffraction light is blocked and does not pass through the aperture 10a due to the light blocking unit 10. However, the positioning may be such that 0-order diffraction light is not blocked and passes through the aperture 10a, as depicted in FIG. 3, i.e., the entirety of the region 13 is in the aperture 10a. In this situation, 1-order diffraction light moving in a particular direction that has been diffracted by an edge of the sample S also passes through a portion of the aperture 10a.

In the phase object visualization apparatus 1 that has the configuration described above, even when the illumination optical system 11 illuminates the sample S with light essentially perpendicular to the sample S, 1-order diffraction light moving in a particular direction that has been diffracted by an edge of the sample S passes through the aperture 10a of the light blocking unit 10. Hence, an image can be formed on the image pickup element 9 such that a contrast is enhanced in a particular direction of the sample S, thereby clearly visualizing a phase object without using oblique illumination.

In general, in a method of visualizing a phase object using oblique illumination, oblique illumination light may be refracted by a culture solution present at a light path along which the oblique illumination light moves until it is incident on a biological sample, or by droplets adhering to a culture container present at the light path, and this may change the angle of the illumination light. That is, depending on the state of the surroundings of the biological sample, the angle of illumination light and, ultimately, the contrast of a generated image may be varied, thereby leading to a problem with prevention of stable visualization of the sample. By contrast, the phase object visualization apparatus 1 detects diffracted light generated by the sample S using illumination light that is perpendicular to the sample S. The light diffracted by the elements other than the sample S that are present at the light path along which illumination light moves until it irradiates the sample S is blocked by the light blocking unit 10 and thus does not affect image formation. Accordingly, in a method of visualizing a phase object using the phase object visualization apparatus 1, the contrast of a generated image is rarely varied with the state of the surrounding of the sample S.

The phase object visualization apparatus 1 detects diffracted light generated by the sample S from illumination light that is essentially perpendicular to the sample S, and hence, unlike the case of using oblique illumination, there would never be a problem of illumination light being blocked by an end portion of a well in which the sample S is held. Hence, the entirety of the sample S, including regions close to the end portion of the well, can be visualized.

The aperture 10a can be moved on a plane that is perpendicular to the optical axis, so that the region through which 0-order diffraction light passes can be adjusted relative to the aperture 10a. This allows selection of a direction in which 1-order diffracted light passes through the aperture 10a.

The aperture 10a may be configured in a manner such that the size can be varied using, for example, an aperture stop. This allows the size of the aperture 10a to be adjusted in accordance with a change in the light flux diameter of illumination light.

The aperture 10a may be located at a position decentered from the optical axis located between the sample S and the image pickup element 9 disposed on an image plane, in a manner such that 1-order diffracted light in a particular direction passes through the aperture 10a and such that 0-order diffraction light passes through a portion of the aperture 10a. The aperture 10a may be located at, or near, the pupil position, or may be located at, or near, a position optically conjugate to the pupil position; the position of the aperture 10a is not limited to the pupil position of the objective 6.

The area occupied on the aperture 10a by 0-order diffraction light passing through the aperture 10a, i.e., the area of the region 13 on the aperture 10a, is desirably 50% of the total area of the aperture 10a or less, so that an image signal can be obtained that has a sufficient contrast to visualize the sample S.

The aperture 10a of the light blocking unit 10 is not limited to a physical aperture. For example, the light blocking unit 10 may include a liquid crystal panel that selectively allows passage of, and selectively blocks, light. In this case, the region through which passes light that the light blocking unit 10 has selectively allowed passage corresponds to the aperture 10a.

Accordingly, the phase object visualization apparatus 1 in accordance with the first embodiment is capable of clearly visualizing a phase object without using oblique illumination.

Figure 4:
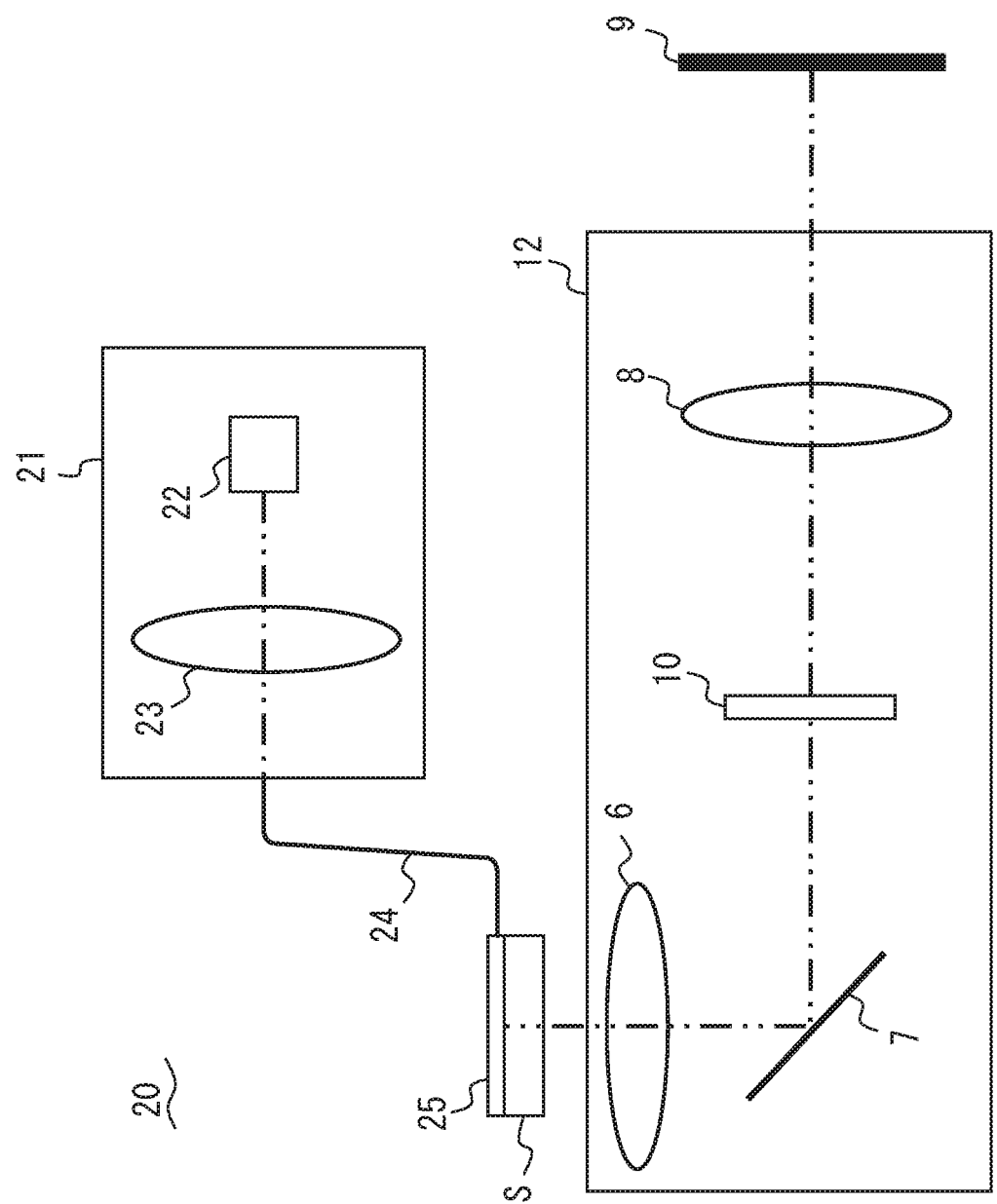
FIG. 4 illustrates a phase object visualization apparatus in accordance with a second embodiment.

The following describes a phase object visualization apparatus in accordance with a second embodiment by referring to the drawings. FIG. 4 illustrates a phase object visualization apparatus 20 in accordance with the second embodiment. The phase object visualization apparatus 20 is different from the phase object visualization apparatus 1 in the sense that the phase object visualization apparatus 20 includes an illumination optical system 21 instead of the illumination optical system 11, and includes an optical guiding fiber 24 and a hologram element 25; in terms of the other components, the phase object visualization apparatus 20 is similar to the phase object visualization apparatus 1.

The illumination optical system 21 includes a light source 22 and a lens 23. A light flux formed by the illumination optical system 21 is guided to the hologram element 25 by the optical guiding fiber 24.

The hologram element 25 is designed to radiate light that has been incident owing to the optical guiding fiber 24 around a direction that is essentially perpendicular to the incident direction of the light. The diameter of 0-order diffraction light at the exit pupil position of the objective 6 depends on the designed angle of radiation. Hence, the design is such that the 0-order diffraction light has a predetermined diameter that does not occupy the entirety of the exit pupil of the objective 6. In this example, the hologram element 25 emits light that is essentially perpendicular to the well plate that holds the sample S. That is, the hologram element 25 irradiates the sample S within the well plate with illumination light that is essentially perpendicular to the sample S.

The phase object visualization apparatus 20, which has the configuration described above, is capable of clearly visualizing a phase object without using oblique illumination.

Figure 5:
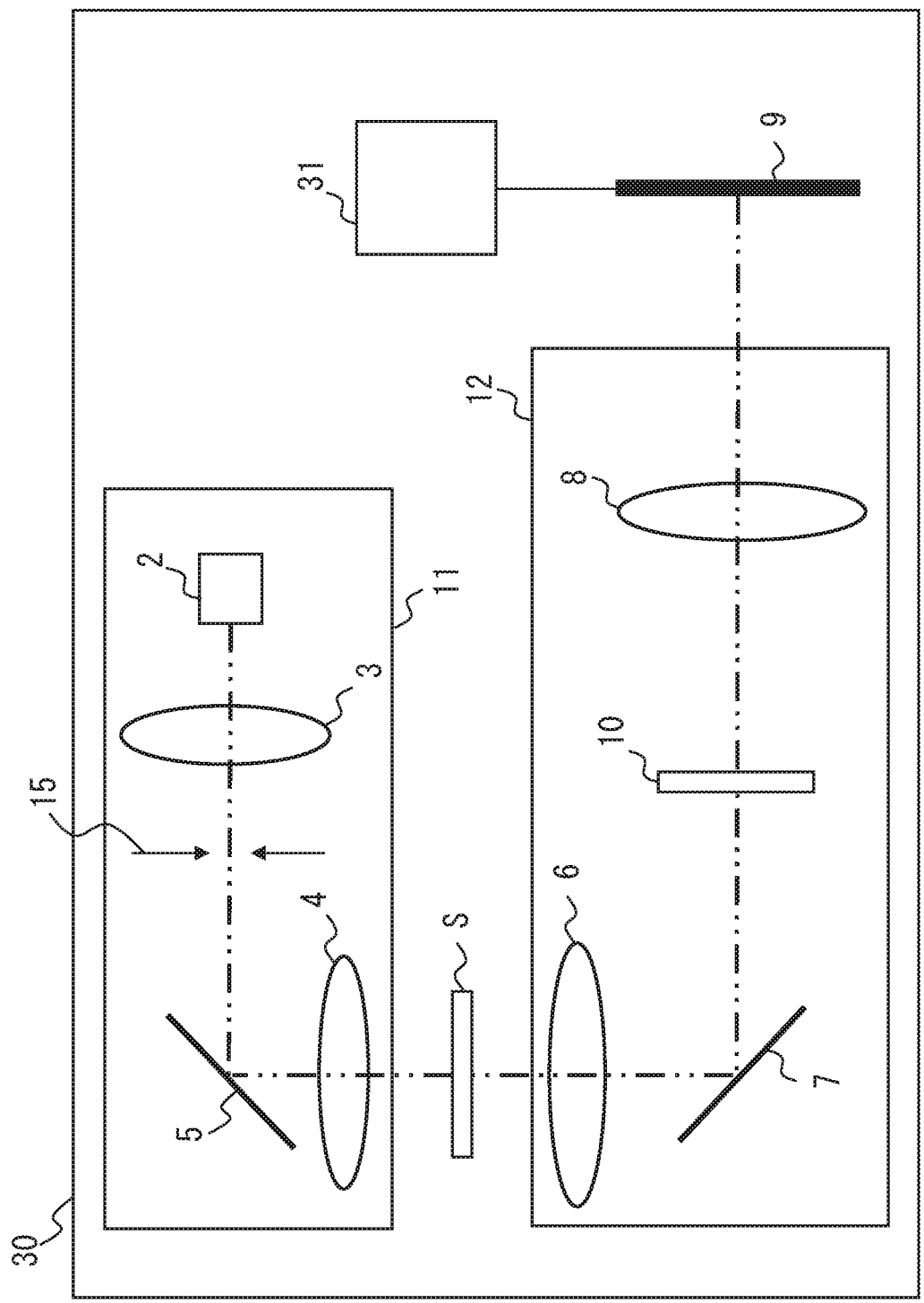
FIG. 5 illustrates a phase object visualization apparatus in accordance with a third embodiment.

The following describes a phase object visualization apparatus in accordance with a third embodiment by referring to the drawings. FIG. 5 illustrates a phase object visualization apparatus 30 in accordance with the third embodiment. The phase object visualization apparatus 30 is different from the phase object visualization apparatus 1 in the sense that the phase object visualization apparatus 30 includes an operational apparatus 31 connected to the image pickup element 9; in terms of the other components, the phase object visualization apparatus 30 is similar to the phase object visualization apparatus 1. As in the case of the first embodiment, the light blocking unit 10 is located at a pupil position of the objective 6. Also as in the case of the first embodiment, the aperture 10a is movable on a plane that is perpendicular to the optical axis of the image formation optical system 12.

Figure 6:
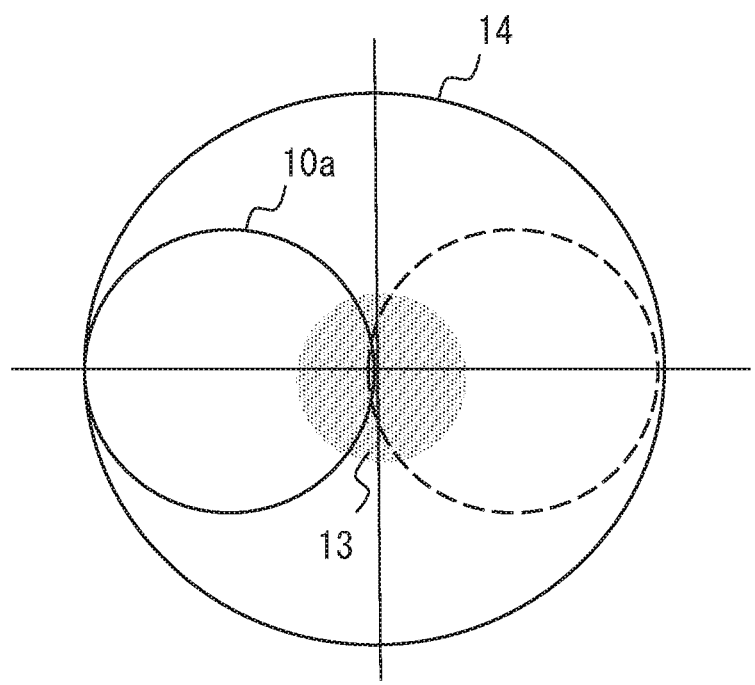
FIG. 6 illustrates an example of the positioning of an aperture in accordance with a third embodiment.

FIG. 6 illustrates an example of the positioning of the aperture 10a in accordance with the present embodiment, wherein the aperture 10a is seen from an optical axis direction. As described above regarding the first embodiment with reference to FIG. 2, the aperture 10a is located at a position decentered from the optical axis of the image formation optical system 12 in a manner such that 0-order diffraction light passes through a portion of the aperture 10a (the position of the aperture 10a in this situation is defined as a first region). In the phase object visualization apparatus 30, the aperture 10a is movable to a position (defined as a second region) such that the aperture 10a and the first region, which is represented as a dotted line, are symmetrical with respect to the optical axis. The phase object visualization apparatus 30 is configured in a manner such that the image pickup element 9 obtains respective image signals (first image signals) when the aperture 10a has been moved to the first and second regions. For each of the two first image signals, an image is formed from diffracted light diffracted by an edge of the sample S, thereby enhancing the contrast in a particular direction of the sample S. The two first image signals are also each an image signal with a contrast, or brightness information, reversed.

The operational apparatus 31 receives the image signal obtained by the image pickup element 9 and performs operational processing using the obtained image signal.

FIG. 7 illustrates functions of the operational apparatus 31 as functional components. The operational apparatus 31 includes a communication unit 32, a storage unit 33, and an operational unit 34 as functional components.

The communication unit 32 receives an image signal from the image pickup element 9 and outputs the image signal to an image display medium (not illustrated) such as a monitor. The communication unit 32 receives respective first image signals obtained regarding the first and second regions described above. The communication unit 32 outputs a second image signal to an image display medium (not illustrated) such as a monitor.

The storage unit 33 is storage means for temporarily storing the first image signal received by the communication unit 32. When, for example, a pair of first image signals have been obtained regarding first and second regions located at positions that are symmetrical with respect to the optical axis, this pair is transmitted to the operational unit 34, which will be described hereinafter.

The operational unit 34 performs operational processing using the pair of first image signals that has been received, so as to generate a new image signal (second image signal). The operational unit 34 transmits the generated second image signal to the communication unit 32.

Figure 8:
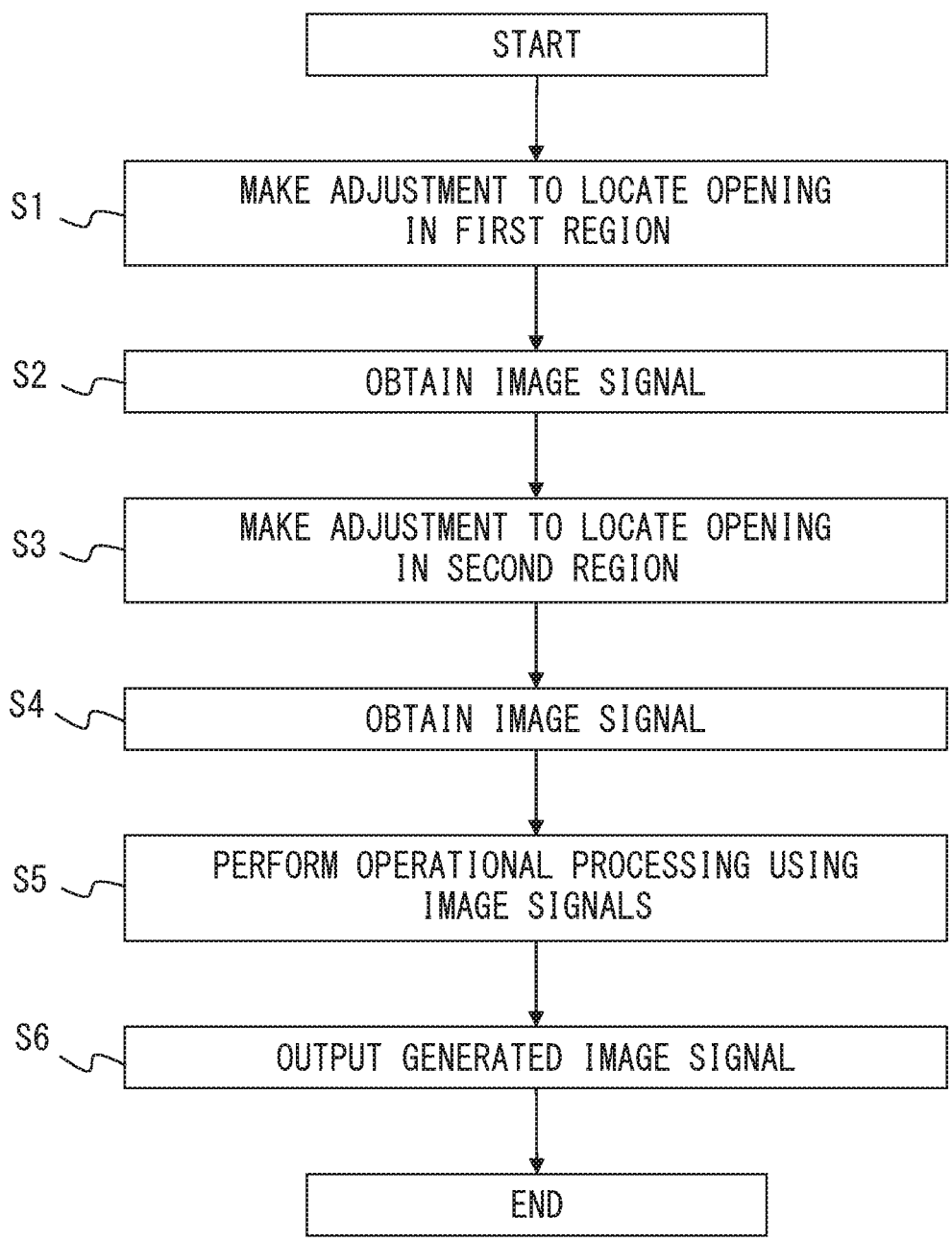
FIG. 8 is a flowchart for visualizing a phase object using a phase object visualization apparatus in accordance with a third embodiment.

By referring to FIG. 8, the following describes a method of visualizing a sample S using a configuration that includes the operational apparatus 31 of the phase object visualization apparatus 30. FIG. 8 illustrates a flowchart for visualizing the sample S using the phase object visualization apparatus 30.

In step S1 of FIG. 8, a user makes an adjustment such that the aperture 10a is located at a position decentered from the optical axis of the image formation optical system 12, as depicted in FIG. 6, in a manner such that 0-order diffraction light passes through a portion of the aperture 10a (the position of the aperture 10a in this situation is defined as a first region).

In step S2, the image pickup element 9 obtains a first image signal. The obtained image signal is transmitted via the communication unit 32 of the operational apparatus 31 and stored in the storage unit 33.

In step S3, the user makes an adjustment such that, as depicted in FIG. 6, the aperture 10a is located in a second region that has a symmetrical relationship with the first region with respect to the optical axis.

In step S4, the image pickup element 9 obtains a first image signal. The obtained image signal is transmitted via the communication unit 32 of the operational apparatus 31 and stored in the storage unit 33.

In step S5, the operational unit 34 performs operational processing using the two first image signals stored in the storage unit 33 in steps S2 and S4, thereby generating a second image signal. By performing operational processing using the two first image signals, the second image signal is generated as the image information described in the following.

First, a contrast-emphasized image is formed by performing difference operational processing using two first image signals. The two first image signals each have their contrast reversed, and hence performing the difference operational processing generates an image signal with a contrast emphasized in a particular direction of the sample S. For example, the following may occur when difference operational processing is performed such that a first image signal obtained when the aperture 10a is located in the second region is subtracted from a first image signal obtained when the aperture 10a is located in the first region (see FIG. 6): a second image signal that is something like an image signal of which the contrast of the first image signal obtained when the aperture 10a located in the first region is remarkably emphasized may be generated by the first image signal obtained when the aperture 10a located in the first region is subtracted.

In addition, the image information that has undergone the differential operation is information obtained by differentiating the phase distribution of the observed object, and hence phase distribution information of the observed object can be formed by performing differential transformation.

In a case where the contrast of one of the first image signals has been reversed (third image signal), the third image signal and the other first image signal without a contrast reversed are stereo images with the same contrast. Hence, for each point on the observed object, the amount of a position gap in the optical axis direction from a focused position can be determined by applying a stereo measurement technique to the first and third image signals, thereby allowing the 3-dimensional position information of the observed object to be measured. The 3-dimensional position information of the observed object may be generated as a second image signal.

In step S6, the communication unit 32 outputs image information that includes the generated second image signal to an image display medium such as a monitor. This step is the end of the flowchart.

The phase object visualization apparatus 30, which has the configuration described above, is capable of clearly visualizing a phase object without using oblique illumination. The phase object visualization apparatus 30 can obtain an image signal with a contrast emphasized more remarkably than in the case of the phase object visualization apparatus 1, thereby more clearly visualizing a phase object.

In the description above, the first and second regions are symmetrical with respect to the optical axis. However, in actual situations, the first and second regions only need to each include 1-order diffracted light in a direction of symmetry of the sample S. That is, as long as the second region includes at least a portion of a region that has a symmetrical relationship with the first region with respect to the optical axis, the effect of the invention can be achieved.

Figure 9:
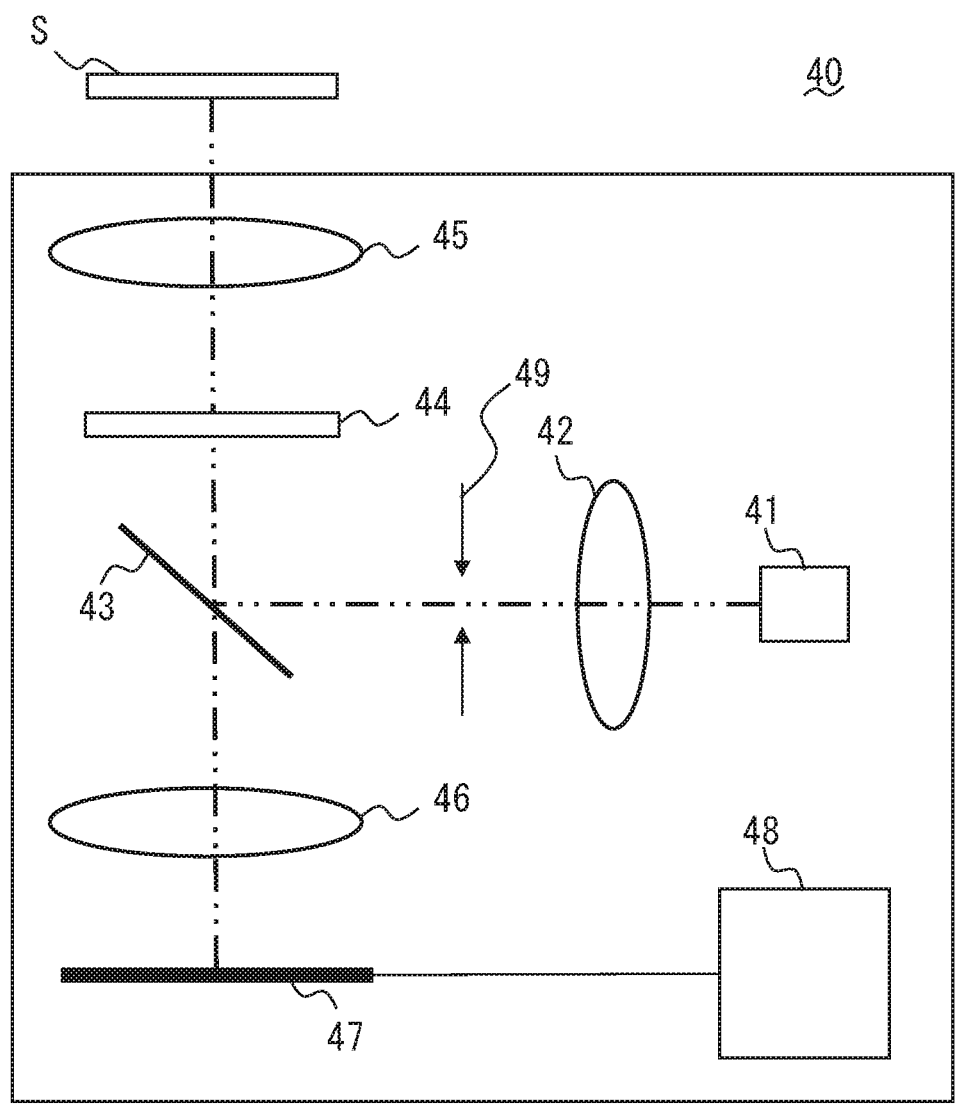
FIG. 9 illustrates a phase object visualization apparatus in accordance with a fourth embodiment.

The following describes a phase object visualization apparatus in accordance with a fourth embodiment by referring to the drawings. FIG. 9 illustrates a phase object visualization apparatus 40 in accordance with a fourth embodiment.

The phase object visualization apparatus 40 is an epi-illumination microscope that applies epi-illumination to a sample S. Accordingly, an illumination light path and a light path intended for forming an image from light from the sample S partly overlap one another.

The phase object visualization apparatus 40 includes a light source 41, a lens 42, an aperture 49, a half mirror 43, light blocking unit 44, and an objective 45, which are disposed on the illumination light path intended for illuminating the sample S. The half mirror 43, the light blocking unit 44, and the objective 45 are also on the light path intended for forming an image from light from the sample S. The phase object visualization apparatus 40 further includes an image formation lens 46 and an image pickup element 47 on the light path intended for forming an image from light from the sample S. The phase object visualization apparatus 40 includes an operational apparatus 48 connected to the image pickup element 47.

The light blocking unit 44 is located at a pupil position of the objective 45, and has a structure that is similar to that of the light blocking unit 10 described above with reference to the first embodiment. In particular, the light blocking unit 44 includes an aperture 44a. In the present embodiment, the aperture 44a is located at a position decentered from the optical axis of a optical system of the phase object visualization apparatus 40 that is disposed on the light path intended for forming an image from light, and that position includes the optical axis.

As in the other embodiments, the sample S is a phase object. However, when the sample S is a biological sample such as cultured cells, an image is formed from light from the sample S via illumination light being reflected from a lid of a culture container such as a well plate that has the sample S stored therein. In the present embodiment, the sample S may be a phase object, e.g., a metal object, with a micro-fabricated surface.

The operational apparatus 48 has functions similar to those of the operational apparatus 31 described above with reference to the third embodiment.

Figure 10:
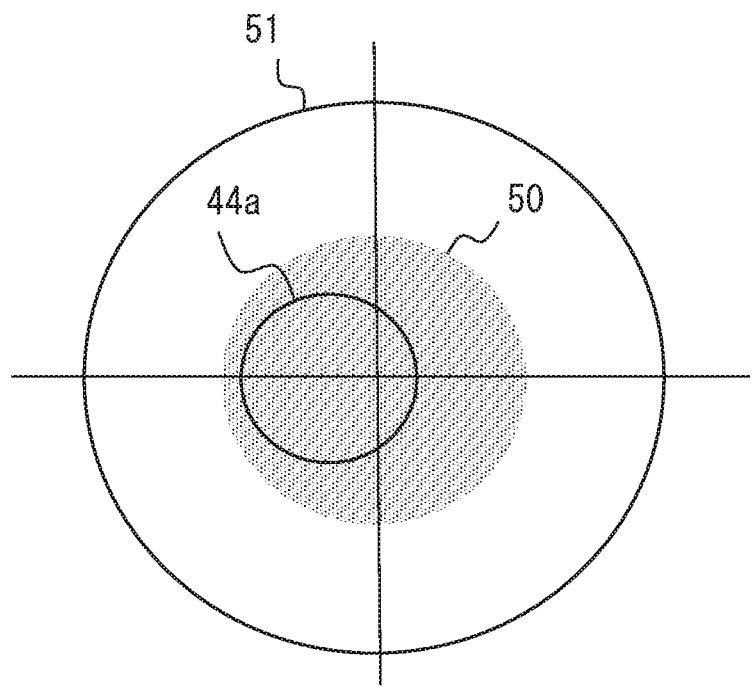
FIG. 10 illustrates an example of the positioning of an aperture during light illumination in accordance with a fourth embodiment.
Figure 11:
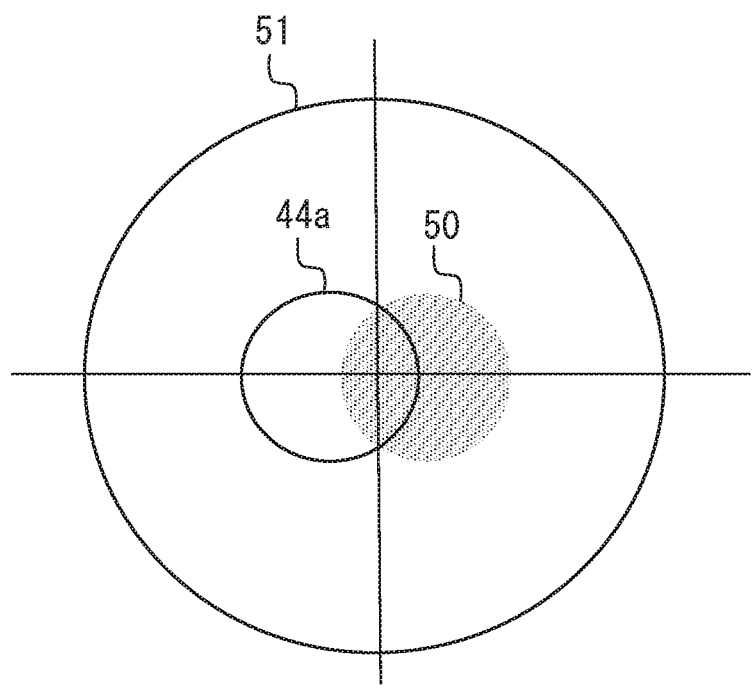
FIG. 11 illustrates an example of the positioning of an aperture during image formation in accordance with a fourth embodiment.

FIGS. 10 and 11 illustrate examples of the positioning of the aperture 44a as seen from an optical axis direction. In particular, FIG. 10 depicts illumination light (0-order diffraction light) from the light source 41 passing through the aperture 44a during light illumination; FIG. 11 depicts 0-order diffraction light from the sample S passing through the aperture 44a during image formation. In the following, by referring to FIGS. 10 and 11, descriptions will be given of a flow from the illuminating of the sample S to the forming of an image on the image pickup element 47 from light from the sample S within the phase object visualization apparatus 40.

In the phase object visualization apparatus 40, during light illumination, first, the sample S is irradiated with illumination light that has passed through the aperture 44a. In this situation, the aperture 44a, a pupil position 51 of the objective 45, and a region 50 formed by 0-order diffraction light incident on the pupil position 51 have the positional relationship depicted in FIG. 10. The 0-order diffraction light, which is illumination light incident on the pupil position 51, passes through the aperture 44a, which is located at a position decentered from the optical axis, and thus obliquely illuminates the sample S. Simultaneously, since the aperture 44a is located at a position that includes the optical axis, the sample S is also irradiated with illumination light that is perpendicular to the sample S.

Subsequently, the light from the sample S reaches the aperture 44a. In this situation, the region 50 formed by the 0-order diffraction light from the sample S that enters the aperture 44a is positioned as depicted in FIG. 11. In this case, since the sample S has been illuminated with light that is perpendicular to the sample S, the 0-order diffraction light passes through the center of the pupil position 51. Since the aperture 44a is located at a position that includes the optical axis, 0-order diffraction light that is incident on a position close to the center of the pupil position 51 (i.e., light from the sample S that includes perpendicular components) passes through a portion of the aperture 44a.

Accordingly, the phase object visualization apparatus 40 is also configured in a manner such that, as in the case of the position of the aperture depicted in FIG. 2 or the like, owing to perpendicular illumination light that irradiates the sample S, 1-order diffracted light in a particular direction that has been diffracted by an edge of the sample S passes through a portion of the aperture 44a. Diffracted light or 0-order diffraction light resulting from oblique illumination that does not pass through the center of, or near the center of, the pupil position 51 is blocked by the light blocking unit 44, and thus does not reach the image pickup element 47, i.e., an image is not formed.

The phase object visualization apparatus 40, which has the configuration described above, is capable of clearly visualizing a phase object without using oblique illumination. In other words, in performing oblique illumination, a phase object can also be clearly visualized on the basis of a principle similar to those of the phase object visualization apparatuses in accordance with the embodiments described above, since, in the phase object visualization apparatus 40, the sample S is irradiated with light that is essentially perpendicular to the sample S owing to the aperture 44a being located at a position that includes the optical axis of the optical system.

Figure 12:
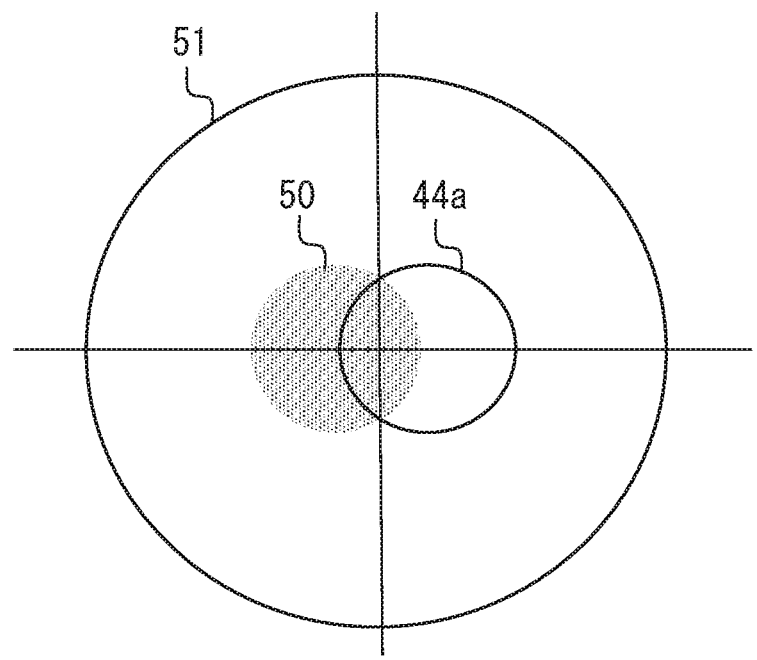
FIG. 12 illustrates another example of the positioning of an aperture during image formation in accordance with a fourth embodiment.

The phase object visualization apparatus 40 is also capable of obtaining an image signal with an emphasized contrast using the operational apparatus 48. When, for example, the aperture 44a is located as depicted in FIG. 11, i.e., when the aperture 44a is a region located in the first region, and an image signal (first image signal) is obtained for the first region. Meanwhile, the aperture 44a is moved to a second region that includes, as depicted in FIG. 12, a region that has asymmetrical relationship with the first region with respect to the optical axis, and an image signal (first image signal) is obtained for the second region. The procedure for visualizing the sample S using the individual image signals obtained for the first and second regions is similar to the procedure described above with reference to FIG. 8 or the like for the third embodiment. As described above, the phase object visualization apparatus 40 is also capable of obtaining an image signal with an emphasized contrast, thereby more clearly visualizing a phase object.

The embodiments described above are specific examples to facilitate understanding of the present invention, and the invention is not limited to those embodiments. Various modifications or changes can be made to the phase object visualization apparatus without departing from the scope of the invention defined in the claims.

What is claimed is:

1. A phase object visualization apparatus comprising:
   an illumination optical system that illuminates a phase object;
   an image formation optical system that forms an image from light from the phase object; and
   a light blocking unit for blocking light, the light blocking unit being disposed in the image formation optical system between the phase object and an image plane formed by the image formation optical system, and the light blocking unit including an aperture at a position decentered from an optical axis of the image formation optical system,
   wherein the aperture is a physical aperture comprising an opening in the light blocking member,
   wherein the aperture is provided at the position decentered from the optical axis of the image formation optical system such that an area occupied on the aperture by 0-order diffraction light from the phase object illuminated by the illumination optical system is smaller than a total area of the aperture, and
   wherein the illumination optical system does not have an aperture decentered from an optical axis of the illumination optical system.

2. The phase object visualization apparatus according to claim 1, wherein the position at which the aperture is provided includes the optical axis of the image formation optical system.

3. The phase object visualization apparatus according to claim 1, wherein the aperture is movable along a plane that is perpendicular to the optical axis of the image formation optical system.

4. The phase object visualization apparatus according to claim 3, further comprising:
   an image pickup element that is disposed on the image plane and that converts the image from the light from the phase object into an image signal; and
   an operational apparatus that performs operational processing using the image signal,
   wherein by performing difference operational processing using a first image signal obtained when the aperture is located in a first region, and a first image signal obtained when the aperture is located in a second region that includes a region having a symmetrical relationship with the first region with respect to the optical axis, the operational apparatus generates a second image signal.

5. The phase object visualization apparatus according to claim 3, further comprising:
   an image pickup element that is disposed on the image plane and that converts the image from the light from the phase object into an image signal; and
   an operational apparatus that performs operational processing using the image signal,
   wherein the operational apparatus generates a second image signal obtained by calculating 3-dimensional position information of the phase object using a third image signal obtained by reversing an image contrast of a first image signal obtained when the aperture is located in a first region, and a first image signal obtained when the aperture is located in a second region that includes a region having a symmetrical relationship with the first region with respect to the optical axis.

6. The phase object visualization apparatus according to claim 1, wherein the area occupied on the aperture by the 0-order diffraction light passing through the aperture is at most 50% of the total area of the aperture.

7. A method of visualizing a phase object by illuminating the phase object using an illumination optical system and by forming an image on an image plane from light from the phase object using an image formation optical system, the method comprising:
   blocking light between the phase object and the image plane, and causing 0-order diffraction light from the phase object illuminated by the illumination optical system to pass through an aperture located at a position decentered from an optical axis of the image formation optical system, wherein the aperture is a physical aperture comprising an opening in a light blocking member; and
   positioning the aperture in a manner such that an area of the 0-order diffraction light passing through the aperture is smaller than an area of the aperture,
   wherein the illumination optical system does not have an aperture decentered from an optical axis of the illumination optical system.

* * * * *